P. A. FLYNN.
LOCK NUT.
APPLICATION FILED MAY 11, 1920.

1,363,504.

Patented Dec. 28, 1920.

*INVENTOR*
*PATRICK A. FLYNN.*
BY

*Edward B. Birkenbeuel.*
ATTORNEY

UNITED STATES PATENT OFFICE.

PATRICK A. FLYNN, OF WILLAMINA, OREGON.

LOCK-NUT.

1,363,504.  Specification of Letters Patent.  Patented Dec. 28, 1920.

Application filed May 11, 1920. Serial No. 380,611.

*To all whom it may concern:*

Be it known that I, PATRICK A. FLYNN, a citizen of the United States, and resident of Willamina, county of Yamhill, State of Oregon, have invented a new and useful Lock-Nut, of which the following is a specification.

My invention relates more particularly to a means for preventing nuts from being loosened or lost from bolts upon which they are placed.

The object of my invention is to provide a locking means for preventing any turning of a nut or bolt after it is in the desired place, unless it is manually released.

Figure 1:
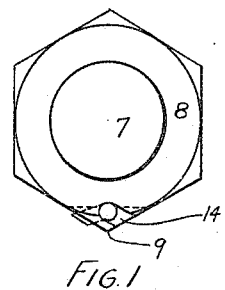
Figure 2:
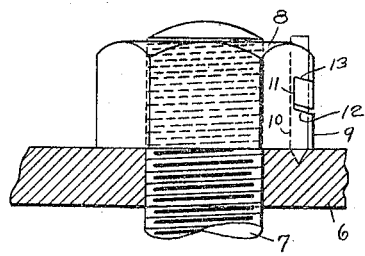
Figure 3:
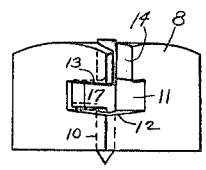
Figure 5:
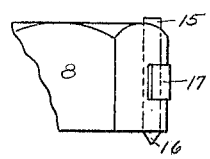
Figure 4:
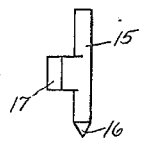

I attain this result in the manner set forth in the specification following and illustrated in the accompanying drawing, in which:

Figure 1 is a plan view of a nut equipped with my device which is illustrated in elevation in Fig. 2 and in a front elevation in Fig. 3. Fig. 4 is a detail of the locking member itself. Fig. 5 shows a modified form of my device but embodying the same general principles.

Similar numbers of reference refer to the same or similar parts throughout the several views.

Referring in detail to the drawing, I have illustrated a plate 6 through which is passed a bolt 7 on which is placed a nut 8. Near one of the corners 9 of the bolt 8 I have formed a hole 10. A groove 11, whose sides 12 and 13 are cut at an angle to the face of the nut 8, is formed on the sides of the nut about midway of its vertical height to a depth which will cut into the hole 10, thereby cutting its length in two. The portion of the hole 10 nearest the chamfered end of the nut is cut away at 14 in the form of a slot.

Separate from the nut 8 and of relatively hard metal I have constructed a locking device which consists of a pin member 15 whose total length is somewhat in excess of the height of the nut 8, and whose lower end is equipped with a point 16. Midway along the length of the member 15 is formed a lug 17 which is adapted to enter the slot 11 after the point 16 has been driven through the hole 10 and into the plate member 6. It is evident that any rotation of the lug 17 and the seating of same in the slot 11 will prevent the point 16 from leaving its self-made recess in the plate 6 and consequently prevent the rotation of the nut 8.

The under-cut side 13 of the slot 11 serves to hold the lug 17 in its locked position. In the modified form of my device shown in Fig. 5 I do not depend upon any under-cut, as shown in Fig. 2, but depend entirely upon having the lug 17 made a tight fit in the slot 11.

In order to remove a nut equipped with my device it is only necessary to pry the lug 17 out of its seat and then raise the point 16 out of engagement with its seat by means of a prying action under the lug 17.

My object in forming the slot 14 in the nut 8 is, as can readily be seen, to enable the device to be assembled. I have illustrated this device in connection with a nut showing the simple manner in which I secure a nut to the surface against which it is bolted. While, under all ordinary circumstances, it is the nut which turns loose rather than the bolt, it will also been seen that it is equally possible to provide a similar lug at the head end of a bolt, or at the head end only in cases where it is difficult to apply a holding wrench to the head while tightening a nut.

While I have thus illustrated and described my device it is not my intention to limit myself to this precise form or method of application, but intend that it shall cover all forms and modifications that fall fairly within the appended claims.

What I claim as new and desire to protect by Letters Patent of the United States, is:

1. A lock nut consisting of a slidable round pointed pin mounted in a nut in a manner that said point may be driven into the face against which the shoulder of the nut rests, and a lock integral with said pin adapted to lock said point in its seated position.

2. A lock nut consisting of a hexagonal cut having a hole drilled through one of its corners parallel to the center line of the nut, a slot cut through said nut corner into said hole about midway in the height of the nut, and a pointed pin slidably mounted in said hole and having a projecting lug adapted to be seated in the slot and held therein by contact with both sides of said slot.

3. A lock nut consisting of a hexagonal nut having a hole drilled in one corner parallel to its center line and having a slot cut across the center of said corner into said hole, the parallel sides of said slot forming an angle with the face of said nut, a locking pin adapted to slide in said hole and be driven into the material against which the nut rests, a locking device adapted to hold said pin in its seated position consisting of a lug formed on the side of said pin, said lug having its sides parallel with those of said slot but slightly nearer together and adapted to be latched into its locked position by the overhanging side of said slot.

4. A lock for bolts consisting of a cylindrical pin having a point formed at its lower end, and a locking lug integral with and projecting at right angles from the middle of its length.

5. A lock nut consisting of a nut having a hole formed near one corner parallel to its center line and having a slot cut across said corner into said hole and having the metal on one side of the outward portion of said hole cut away in a manner to admit a locking pin and its projecting locking means.

PATRICK A. FLYNN.